United States Patent
Bello Delgado et al.

(10) Patent No.: US 12,507,889 B2
(45) Date of Patent: Dec. 30, 2025

(54) OCT ZONULE IMAGING

(71) Applicants: Carl Zeiss Meditec, Inc., Dublin, CA (US); Carl Zeiss Meditec AG, Jena (DE)

(72) Inventors: Simon Bello Delgado, Pleasant Hill, CA (US); Yingjian Wang, Fremont, CA (US); Amanda Carpenter, Pleasanton, CA (US); Si Xi Zhao, Vancouver (CA); Kabir M. Arianta, Livermore, CA (US); Jonathan Bumstead, San Ramon, CA (US)

( * ) Notice: Subject to any disclaimer, the term of this patent is extended or adjusted under 35 U.S.C. 154(b) by 575 days.

(21) Appl. No.: 17/799,632

(22) PCT Filed: Feb. 18, 2021

(86) PCT No.: PCT/EP2021/054053
§ 371 (c)(1),
(2) Date: Aug. 12, 2022

(87) PCT Pub. No.: WO2021/165414
PCT Pub. Date: Aug. 26, 2021

(65) Prior Publication Data
US 2023/0073778 A1      Mar. 9, 2023

Related U.S. Application Data

(60) Provisional application No. 62/979,616, filed on Feb. 21, 2020.

(51) Int. Cl.
*A61B 3/117* (2006.01)
*A61B 3/00* (2006.01)
(Continued)

(52) U.S. Cl.
CPC ............ *A61B 3/117* (2013.01); *A61B 3/0025* (2013.01); *A61B 3/102* (2013.01); *A61B 3/1233* (2013.01); *A61B 3/14* (2013.01)

(58) Field of Classification Search
CPC ....... A61B 3/117; A61B 3/0025; A61B 3/102; A61B 3/1233; A61B 3/14; A61B 3/12
(Continued)

(56) References Cited

U.S. PATENT DOCUMENTS

| | | |
|---|---|---|
| 2009/0005187 A1 | 1/2009 | Schechter |
| 2009/0051872 A1 | 2/2009 | Volk |

(Continued)

FOREIGN PATENT DOCUMENTS

| | | |
|---|---|---|
| JP | 60-253430 | 12/1985 |
| JP | 04-503177 | 6/1992 |

(Continued)

OTHER PUBLICATIONS

Submitting publication No. 20090051872 to replace incorrect publication No. 20090005187 disclosed on Nov. 12, 2024. Please omit reference 20090005187 from the Information Disclosure Statement filed on Nov. 12, 2024.

(Continued)

*Primary Examiner* — Mohammed A Hasan
(74) *Attorney, Agent, or Firm* — SNELL & WILMER L.L.P.

(57) ABSTRACT

A system, method, or device for imaging the anterior segment of an eye includes a contactless adapter/lens that may be attached to an existing ophthalmic imaging system to redirect the imaging system's light beam to traverse the pupil of the eye at a steep angle. In particular, the steep angle is determined to permit the ophthalmic imaging system to image zonules under the iris, and which would typically be blocked by the iris and not accessible for imaging.

19 Claims, 10 Drawing Sheets

(51) Int. Cl.
*A61B 3/10* (2006.01)
*A61B 3/12* (2006.01)
*A61B 3/14* (2006.01)

(58) Field of Classification Search
USPC .......................................................... 351/206
See application file for complete search history.

(56) References Cited

U.S. PATENT DOCUMENTS

| | | | | |
|---|---|---|---|---|
| 2010/0110379 | A1* | 5/2010 | Zhou ..................... | A61B 3/103 |
| | | | | 351/205 |
| 2013/0286348 | A1* | 10/2013 | Makihira ............. | A61B 3/1025 |
| | | | | 351/246 |
| 2021/0386315 | A1* | 12/2021 | Anderson ......... | A61M 25/0127 |

FOREIGN PATENT DOCUMENTS

| | | | | |
|---|---|---|---|---|
| JP | 2000-504251 | | 4/2000 | |
| JP | 2010-508120 | | 3/2010 | |
| JP | 2010-521224 | | 6/2010 | |
| JP | 2011-120892 | | 6/2011 | |
| JP | 2013-094410 | | 5/2013 | |
| WO | 9015570 | | 12/1990 | |
| WO | WO-2006006048 A1 | * | 1/2006 | ............. A61B 3/135 |
| WO | WO-2008060500 A2 | * | 5/2008 | ............. A61B 18/20 |
| WO | WO-2011050249 A1 | * | 4/2011 | ............. A61B 3/102 |

OTHER PUBLICATIONS

Unable to retrieve original JP application 04-503177. Counterpart application WO9015570 has been provided.
JPO, Office Action dated Nov. 5, 2024 in JP Serial No. 2022549622.

\* cited by examiner

OCT ZONULE IMAGING

PRIORITY

This application is a National Phase application under 35 U.S.C. § 371 of International Application No. PCT/EP2021/054053, filed Feb. 18, 2021, which claims priority to U.S. Provisional Application Ser. No. 62/979,616, filed Feb. 21, 2020, the contents of which are hereby incorporated by reference in their entirety.

FIELD OF INVENTION

The present invention is generally directed to optical coherence tomography (OCT) imaging of the anterior of an eye. More specifically, it is directed to OCT imaging immediately under the iris, and particularly to imaging the zonules of the eye.

BACKGROUND

FIG. 1 shows the anterior portion of an eye 11, including the cornea 13, anterior chamber 15, iris 17 whose center opening defines the pupil 19, the crystalline lens 21, the sclera 27 (the white of the eye), and the limbus 29 (the border of the cornea 13 and sclera 27). Also shown are zonules 23, which are fibrous structures that hold the crystalline lens 21 in place and allow for accommodation through contractions of the ciliary muscle (or ciliary body) 25. Imaging the zonules would be beneficial not only for disease diagnoses purpose, but for determining a current state (e.g., number, thickness variation, integrity, strength, etc.) of the zonule prior to a medical ophthalmic procedure, such as a procedure that may disturb the crystalline lens 21.

Zonular imaging, however, is complicated due to the zonules 23 being located below/behind the iris 17, which blocks imaging light from directly reaching the zonules 23. Consequently, there is currently no convenient and reliable way to visualize or image the lens zonules 23. This limits understanding of the anatomy and pathological processes involving the zonules 23, which is important in diseases such as pseudo-exfoliation syndrome, pigment dispersion syndrome, Marfan syndrome, Weill-Marchesani syndrome, ectopia lentis, and trauma, amongst others. Furthermore, due to the lack of zonular imaging, zonular support during cataract surgery cannot be reliably evaluated pre-operatively. Often, zonular weakness and zonular dialysis (a deficiency of zonular support for the lenticular capsule, which is the membrane that surrounds the crystalline lens 21) is only appreciated intra-operatively during cataract surgery, and is a surprise to the surgeon. Because the surgeon is not able to plan his surgery accordingly, this may lead to complications such as posterior capsular rupture and retained nuclear fragments, which in turn may require additional surgeries and/or compromise the final surgical outcome.

Most previous efforts to visualize the zonules center on ultrasound biomicroscopy (UBM), which uses ultrasound to determine the depth of tissue structures by directly measuring a time delay of returning ultrasound signals. UBM, however, is time consuming for a physician since it cannot be performed by a technician, and is uncomfortable for a patient. Furthermore, according to previous histopathological studies, the width of individual zonules is typically in the range of 10-30 µm, which is below the typical resolution limit of UBM, which is about 50 µm.

Optical coherence tomography (OCT) provides higher resolution imaging, and is a less invasive imaging technology. Although not directed to zonular imaging, efforts to image the anterior of the eye at a steeper angle than typical using OCT have been put forth. For example U.S. Pat. Nos. 9,517,006 and 9,936,868, both to Izatt et al., describe a system for imaging the limbal area of an eye. Izatt et al. use a custom contact lens configured to aim an OCT beam towards the limbus 29 of the eye 11. This approach, however, requires the OCT system to come in contact with the eye (e.g., the cornea), which complicates its use, and further does not provide for imaging below the iris. Izatt's approach seems to be geared to imaging the iridocorneal angle in the anterior chamber. Because of the refractive index mismatch between air and the anterior segment, the light is refracted, and it is difficult to direct a beam to measure the iridocorneal angle. Therefore, Izatt provides a contact lens to add media with similar refractive index between the optics and the cornea. The beam does not refract at the interface. This is evident from Izatt's figures.

It is an object of the present invention to provide a system and method for imaging the anterior of an eye below the iris at steep angles.

It is another object of the present invention to provide an ophthalmic imaging system (e.g., a fundus imager or an OCT system) for imaging the anterior region of the eye immediately below the iris that avoids contact with the eye, e.g., does not contact the cornea or sclera of the eye.

It is a further object of the present invention to provide a system and method for imaging the zonules of the eye with an ophthalmic imaging system.

SUMMARY OF INVENTION

The above objects are met in a method/system/device using or including a noncontact (contactless) lens adapter (e.g., an ophthalmic "cup") that may be fitted (e.g., coupled or attached) onto an existing ophthalmic imaging system (e.g., a fundus imager and/or OCT system), and which allows for direct imaging of the lens zonules. Angle directionality may be achieved through the noncontact (contactless) adapter (or cup), which may house a one or more transmissive and reflective optics (e.g., mirrors, retroreflectors, prisms, beamsplitters, etc.) for redirecting a light beam. For example, the noncontact adapter may include one or more reflective surfaces that redirect an imaging light beam from the ophthalmic imaging system to the eye at a steep angle (e.g., ≥70 degrees relative to the optical center of the imaging system) to image a region immediately below the iris (e.g., a region including the zonules and/or ciliary body). Because of the refractive index mismatch between air and the anterior segment of the eye, the imaging light beam is refracted at the cornea (e.g., as the imaging light beam passes from air through the cornea to the anterior chamber). The steep angle at the cornea helps to compensate for this refraction and permits imaging the region immediately below the iris without touching the eye. This is in contrast, for example, to the approach used by Izatt, above, which not only requires more shallow angles at the cornea (e.g., much less steep incident angles) to observe the limbus of the eye (e.g., the iridocorneal angle), which is above the iris, but also requires a custom contact lens with a special medium (in contact with the eye) with similar refractive index between the optics and the cornea to avoid refraction at the cornea.

The present zonular imaging system provides high enough resolution to accurately assess the health of individual zonule fibers (e.g., including quantification metrics such as density, thickness, length, branching points, branch count, etc.), which may provide for significant diagnostic value (e.g., a structural health numeric value on a predefined health scale).

The noncontact lens (e.g., adapter) of the present invention may include one or more flat and/or curved mirrors (or a combination of both) to aim an imaging (scan) beam (e.g., an OCT beam) at an optimized angle to target an ophthalmic anatomical feature of the anterior segment of the eye (e.g., immediately) below the iris and including, or proximate to, the ciliary body, such as for imaging the zonules. The present noncontact lens (adapter) further allows for a patient to maintain a central fixation while allowing the imaging beam to scan around the patient's crystalline lens. For example, the noncontact lens may provide an unimpeded view (through the noncontact lens) from the patient's eye perspective (point of view) such that the patient can maintain a central fixation even while the noncontact lens permits scanning around the (e.g., outer edge region of) crystalline lens (e.g., the zonules and ciliary body). Thus, the present imaging system may be used to quantify zonule length, thickness, density (e.g. density distribution around the crystalline lens), branching characteristics, location and number of zonule contact points with the crystalline lens and/or capsular bag, and other tissue properties to determine the structural health (e.g., value, grading, or rating) of the zonules. For example, the different quantified physical characteristics may be assigned a diagnostic rating based on a predetermined normative scale, and a weighted sum of the observed ratings of the characteristics may be determined. An overall diagnostic rating (e.g., of excellent, good, marginal, or bad) may be assigned based on the resultant, weighted sum. Characteristics that are identified as being more important to determining the zonules' capacity to withstand a surgical procedure, such as zonule count, branching count, thickness, and number of contact points with the ciliary body and/or the crystalline lens/capsular bag may be weighted more heavily than others.

The above objects are met in an adapter having one or more reflective surface to direct a first light beam from an ophthalmic imaging system at an optimized angle selected to target and image zonules of the eye through the pupil of the eye. The ophthalmic imaging system may be one of a fundus imaging system, an optical coherence tomography (OCT) system, or a combination of both. Preferably, the adapter is separated from, and avoids contact with, the cornea or sclera of the eye while the zonules are being imaged. Optionally, the eye may maintain a central fixation while first light beam scans around the crystalline lens of the eye.

Optionally, the reflective surface is curved. The reflective surface may be implemented as a first conic surface. The adapter may include a second reflective conic surface concentric with the first conic surface. The second reflective surface may also be flat and located closer to the optical center of the imaging system than the first reflective surface.

The adapter's reflective surface may be off-center, and a center region of the adapter may be configured to permit passage of a second light beam from (e.g., emitted by) the ophthalmic imaging system. This second light beam may be a fixation target projected into the eye and/or a second imaging beam for imaging the eye (e.g., imaging the exterior region, the cornea, or retina of the eye).

The ophthalmic imaging system may include a computer processor to quantify one or more tissue properties including one or more of zonule length, zonule thickness, and zonule density. The computer processor may further determine a structural health rating based on the quantified one or more tissue property. For example, the health rating may be a numerical value based on a predefined numerical scale (e.g., a scale from one to ten).

Other objects and attainments together with a fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g. system, can be claimed in another claim category, e.g. method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts.

DESCRIPTION OF THE PREFERRED EMBODIMENTS

The present system provides views of ophthalmic structures behind the iris in unprecedented detail. In particular, it can reliably identify the anatomy and any pathology of the zonular fibers and peripheral lens (the peripheral region of the crystalline lens) of a patient. The present system has been shown to be fast and effective, while avoiding any direct contact with a patient's eye (e.g., no contact with the cornea or sclera). Particular embodiments have been optimized to be easily adapted to existing ophthalmic imaging systems, and to be easily used by those trained to use these existing ophthalmic imaging systems. Consequently, the present invention may be integrated into current cataract and anterior segment ophthalmology practices with minimal effort.

Figure 1:
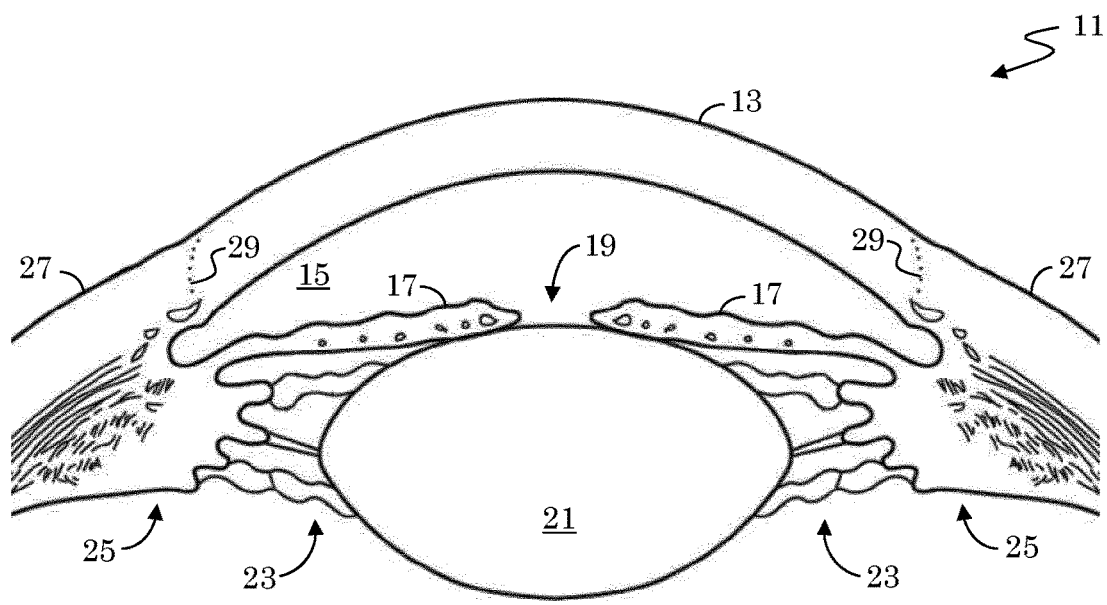
FIG. 1 shows an anterior portion of an eye.
Figure 2:
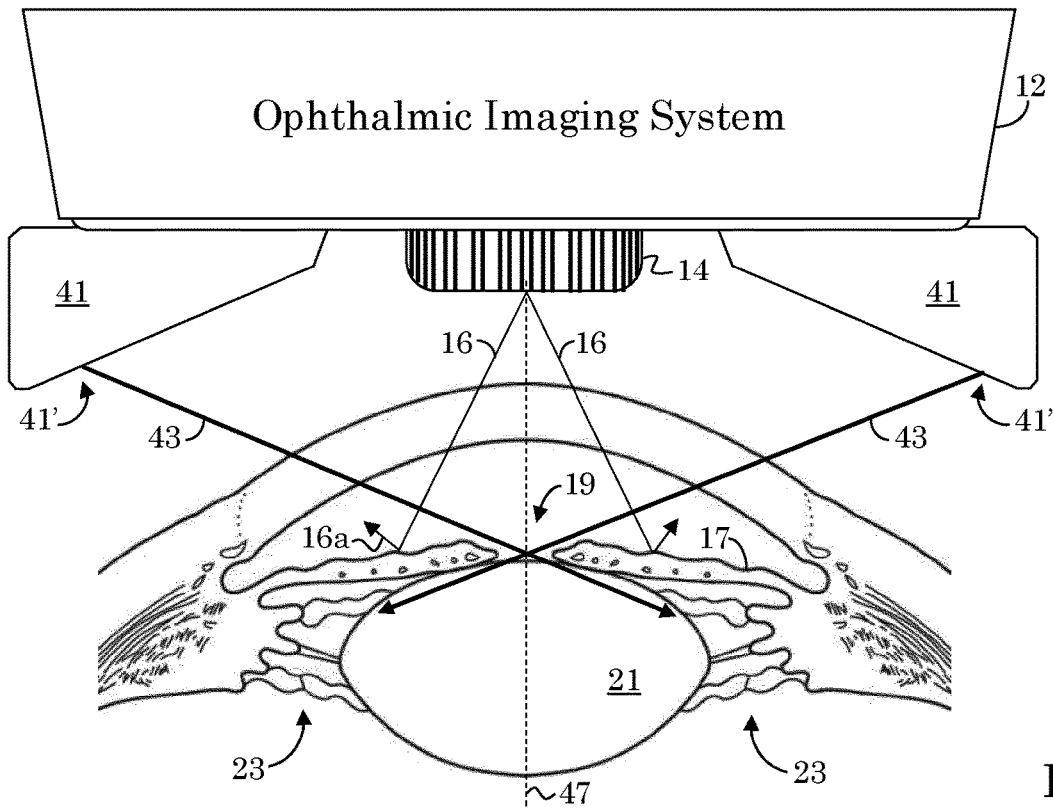
FIG. 2 shows an existing ophthalmic imaging system incorporating an adapter in accord with the present invention.

For illustrative purposes, FIG. 2 shows a representation of an existing ophthalmic imaging system 12, such as a fundus imager or optical coherence tomography (OCT) system, incorporating an adapter 41 in accord with the present invention. A fundus imager typically captures two-dimensional (2D) planar images of the fundus (e.g., the retina) of an eye. An OCT system may generate 2D or three-dimensional (3D) images of subcutaneous tissue, such as the various tissue layers of the retina. An OCT system may generate images of an anterior segment of an eye, such as the cornea, or the posterior segment of the eye, such as the retina. OCT angiography may provide images of retinal vasculature (blood flow), and an anterior segment OCT (AS-OCT) may be specialized for imaging the anterior region of the eye by use of an add-on adapter. A more detailed discussion of various exemplary ophthalmic imaging systems suitable for use with the present invention is provided below with reference to FIGS. 10 to 13.

Irrespective, a typical ophthalmic imaging system generally has an aperture 14 through which its imaging beam (or imaging light) 16 exits to image an eye. The imaging beam will generally have a limited angular range, which limits the field-of-view of the ophthalmic imaging system. Additionally, various anatomical features of an eye, such as the iris are impervious to the imaging beam 16 (as illustrated by the bouncing arrows 16a) and thus limit what parts of an eye may be imaged. For example, an OCT imaging beam cannot penetrate the iris 17 to reach and image the anatomy covered by the iris. To overcome this limitation, the present invention may increase the incident angle of an imaging (light) beam 43 (e.g., the angle with reference to the optical center (or optical axis) 47 of the ophthalmic imaging system 12) so as to enter the eye pupil 19 at a steep angle and reach the anterior segment of the eye immediately below the iris, which was previously not accessible. For example, by use of the present contactless adapter 41, the functionality of the ophthalmic imaging system 12 may be expanded to image the zonules, which has heretofore not been practical. Although not shown for ease of illustration, it is to be understood that imaging beam 43 is refracted at the cornea due to the refractive index mismatch between the interface of air and the anterior segment. Therefore imaging beam 43 may be applied at a steeper angle (e.g., greater than 70°) at the cornea than at the pupil to account for refraction at the interface, and still have a sufficiently steep angle at the pupil to image immediately below the iris.

This increase in incident angle may be achieved by modifying the internal optics of the ophthalmic imaging system, but it is presently preferred to avoid such modifications. Instead, some embodiments of the present invention provide an adapter (e.g., contactless lens adapter) that may be attached (coupled) to the ophthalmic imaging system 12 and redirect its imaging beam 16 from its normal exit aperture 14 to an axially offset and angled aperture 41' to generate the steep imaging beam 43. Optionally, if the ophthalmic imaging system is already of the type that is configured to accept an existing aperture adapter, such as an AS-OCT, the present contactless adapter 41 may be configured to have a similar coupling mechanism as the existing aperture adapter so as to be interchangeable with the ophthalmic imaging system's existing aperture adapter. Alternatively, the contactless adapter of the present invention may be made to have a specialized coupling mechanism configured to couple onto a specific ophthalmic imaging system.

Figure 3:
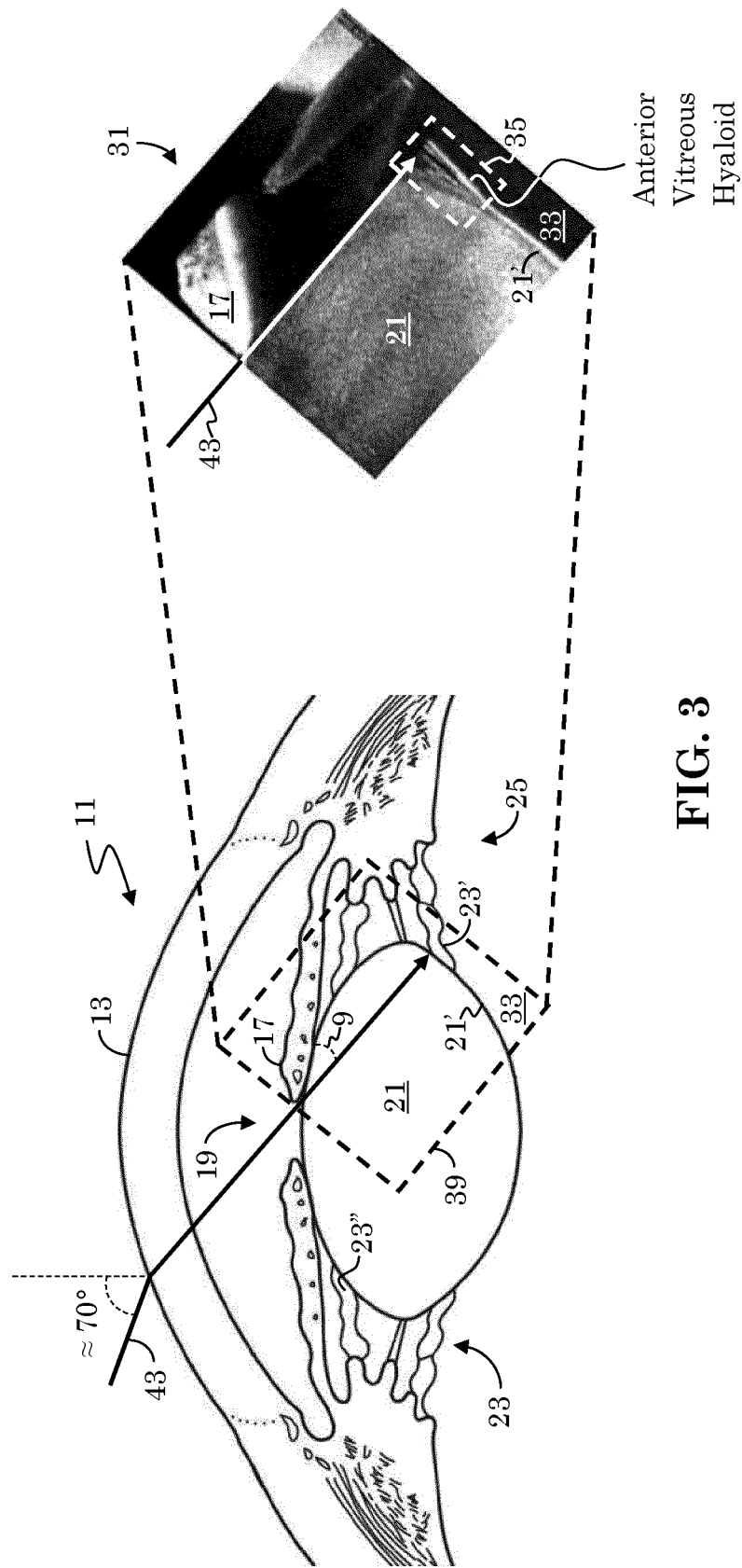
FIG. 3 illustrates an exemplary OCT image achievable with the present invention.

FIG. 3 illustrates an exemplary OCT image 31 achievable with the present invention. The health and stability of zonular fibers are crucial factors in the outcome of cataract surgery. The visualization of such structures pre-operatively is difficult due to their positioning posterior to the iris, which blocks light and prevents scattering. For illustration purposes, dashed square 39 generally outlines a portion of schematic eye 11 that may correspond a portion of a real eye as shown in image 31. An exemplary imaging optical beam (or imaging light beam) 43, such as from an OCT system, is shown entering the cornea 13 at a steep angle (e.g., about 70°) and being refracted at the cornea 13 due to the refractive index mismatch between air and the anterior segment, continuing through the pupil 19 to image the lower regions of the zonules 23 (and/or ciliary body 25) under the iris 17. The present embodiment(s) can reliably image the anatomical location of the peripheral lens (e.g., the peripheral region of the crystalline lens 21, including the capsular bag, or lens capsule, 21' that encapsulates the crystalline lens 21), anterior vitreous 33, and posterior zonules 23'. The present approach permits for individual zonular fibers 35 to be resolved in image 31. As it would be understood, an upper portion 23" of the zonules 23 may be imaged by applying imaging optical beam 43 at an even steeper angle (e.g., forming a shallow (small) angle 9 under the iris 17 with respect to a horizontal reference line (e.g., at the iris) orthogonal to the optical axis).

A clinical study was conducted to evaluate the feasibility of zonular imaging using swept-source ocular coherence tomography (SS-OCT). A PLEX Elite® 9000 (ZEISS®, Dublin, CA) SS-OCT was modified with an external add-on lens (e.g., adapter 41 in FIG. 2) (+20 diopter) to image the anterior segment of the eye. Healthy subjects were recruited and dilated for this study. The zonular structures were imaged using a 4.5×1.5 mm scan pattern, which captures 300 A-scans in one B-scan frame. Each B-scan was repeated, registered and averaged 10 times to reduce speckle noise. There were a total of 51 B-scans in the cube. Eye motion tracking was disabled for this study, but the scan pattern was designed to acquire all data in less than two seconds in order to minimize motion artifacts. Five subjects (ages ranging from 18 to 65) were successfully imaged. The steep incision angle allowed incoming light to go through the crystalline lens 21 and reach a portion of the zonular clusters 23, avoiding blockage from the iris 17. This preliminary imaging technique allowed for imaging of about half of the zonular cluster length. Additionally, a strong signal was identified just posterior to the lens capsule 21' which may likely represent the anterior hyaloid face of the vitreous. The present invention provides the first demonstration of zonular structure and anterior vitreous imaging using SS-OCT. The advantage of this system is that it provides a view of the structures behind the iris in unprecedented detail, and has the potential to help identify the anatomy of the zonular fibers, peripheral lens, and anterior vitreous of the patient, facilitating surgical planning.

Thus, the present invention provides views of anatomic structures behind the iris, and can reliably identify the anatomy and any pathology of the zonular fibers and peripheral lens of a patient. Furthermore, the present invention is fast and avoids any direct contact with the patient's eye (e.g., cornea and/or sclera), which facilitates its use. As is explained more fully below, the present invention may be integrated into existing ophthalmic imaging systems. Therefore, the present system can be easily used, with little additional training, by technicians who are already trained to use the existing ophthalmic imaging systems. Consequently, the present invention may be integrated into existing cataract and anterior segment ophthalmology practice, and thus provide new and important diagnostic information with minimal interruption to existing medical practice procedures.

For example, an anterior segment optical coherence tomography (AS-OCT) may already make use of a removable, specialized lens system. The present invention may be incorporated into an adapter (or "OCT eye cup") that provides another specialized lens system interchangeable with that of an existing AS-OCT.

An exemplary area where the present invention may find immediate utility is in the field of cataract surgery and intraocular lens implants. The success of such surgical procedures is linked to the physical state of a patient's zonules, but heretofore it has not been possible to easily observe/discern the state of a patient's zonules prior to surgery or after a surgical procedure. Because the present invention permits direct 3D imaging of zonules, using an AS-OCT with the present specialized lens adapter, it becomes possible to diagnose and help manage zonular weakness and/or (zonular) dehiscence in the setting of cataract surgery. The present invention may also be used to help determine the precise power of an intraocular lens (IOL) to be implanted during cataract surgery to achieve an ideal refractive outcome. The present invention may also be used to diagnose and help manage post-operative zonular weakness and/or dehiscence after cataract surgery. The present system also permits one to diagnose lens or IOL subluxation or luxation, as well as to diagnose zonulopathy, which may be associated with the following conditions: Trauma; Previous surgery; Advanced age; Pseudo-exfoliation syndrome; Pigment dispersion syndrome; Marfan syndrome; Ehler-Danlos syndrome; Weill-Marchesani syndrome; Homocysteinuria; Aniridia; Ectopia lentis; Ectopia lentis et pupillae; Ciliary body coloboma; and/or Hypermature cataract. The present invention may also be used to diagnose misplaced IOL (out of the capsular bag), uveitis-glaucoma-hyphema (UGH) syndrome, tumours of ciliary body, and iris epithelial cysts and tumours of the posterior iris. The diagnosis may be made by visual inspection by a trained professional of the captured image, or by a computerized system that makes use of quantification metrics and normative scales for various medical conditions, and/or machine learning techniques, such as Decision Trees, Linear Regression, Support Vector Machines (SVM) or Neural Networks trained to recognize the above-listed diagnoses based images using the present imaging techniques.

Figure 4A:
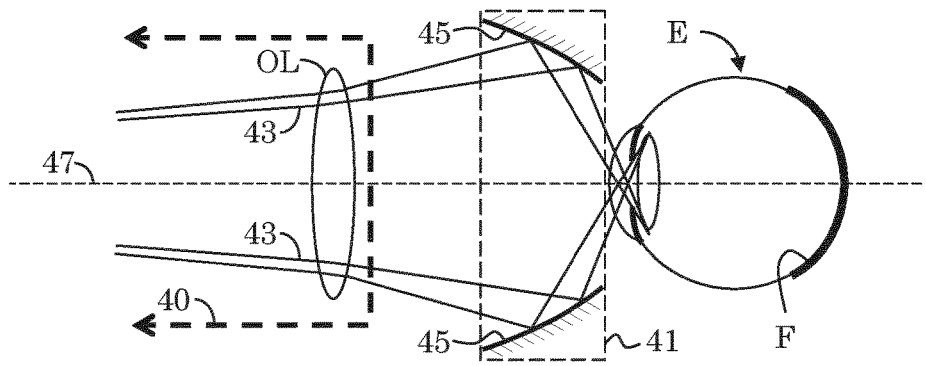
FIGS. 4A, 4B, 4C and 4D illustrate four exemplary embodiments of the present invention.

FIGS. 4A to 4D illustrate four exemplary embodiments of the present invention. With reference to FIG. 4A, the present invention may include a noncontact adapter (noncontact, or contactless, lens) 41 (optionally a radial (e.g., circular) adapter and/or a radially symmetric adapter), such as an "OCT/imaging eye cup", for use with an ophthalmic imaging systems 40 (such as an OCT, OCTA, fundus imager, or a combination thereof) to illuminate and image ophthalmic anatomical features typically obscured by the iris (such as the zonules of an eye) and which may be located in a (e.g., circumferential) region of the anterior segment of the eye (e.g., immediately behind the iris). For illustration purposes, the ophthalmic imaging system 40 is indicated by dotted arrows, and an ocular (or ophthalmic) lens OL of the ophthalmic imaging system 40 is also shown. Typically, the ocular lens OL would be the lens of the ophthalmic imaging system 40 closest to the patient's eye E, and the lens through which the system's imaging beam (e.g., a scan beam) 43 exits the ophthalmic imaging system 40 to enter the eye E. The ocular lens OL may focus the imaging beam 43 onto an object to be imaged, and would typically direct the imaging beam 43 along the optical center 47 of the ophthalmic imaging system 40 to image the back of the eye E (e.g., the fundus/retina F). In the present case, however, imaging beam 43 is made to scan an outer perimeter region of ocular lens OL, and adapter (noncontact lens) 41 redirects this periphery imaging beam 43 at steep angle through the eye's pupil onto the anterior segment of the eye E. The adapter 41 may have curved and/or angled reflective surface(s) 45 that direct the imaging beam 43 (e.g., directs the imaging light path of the ophthalmic imaging system) at a high angle relative to the optical center 47 of the imaging system. For example, in case of imaging zonules, the adapter 41 may direct the imaging beam 43 at an angle of about a 70 degrees, or greater, from optical center 47 to enter the eye E and reach the eye's zonule without being clipped/blocked by the eye's iris. The reflective surface 45 may be one continuous curved surface along the inner perimeter of the adapter 41, or may be one or more discrete (flat or curved) reflective surfaces (e.g., mirror surfaces) located at predefined positions and angles within the inner perimeter of the adapter 41 to direct the imaging light path of the ophthalmic imaging system at predefined locations along the anterior segment of the eye E. Reflective surface 45 may be a peripheral curved reflective surface in the shape of a conical section with curvature along the z-axis 47 (e.g., optical center of the imaging system). The curvature of the reflective surface 45 may serve to create a focus at the same distance from the reflective surface 45 on both translational axes (e.g., x-axis and y-axis), and thus prevent (or mitigate) astigmatism of the illumination and imaging. In one embodiment, the ocular lens OL may direct the imaging beam 43 using a single curved mirror 45, which combined with a custom scan pattern, allows the ophthalmic imaging system 40 to image in 360 degrees around the crystalline lens of the eye E, and thereby capture all zonules in a single shot. Alternatively, several mirror surfaces 45 may be used to respectively scan superiorly, inferiorly, nasally and/or temporally using multiple acquisitions (e.g., multiple scanning operations). Reflective surfaces 45 may be single mirrors at each location, or multiple mirrors per quadrant, each featuring slightly different reflection angles so as to account for (e.g., small) anatomical variations between subjects (e.g., patients).

In order for the imaging system of FIG. 4A to properly image the posterior segment of the eye E through the center region of ocular lens OL and the anterior segment of the eye E through a peripheral region of ocular lens OL and reflective surface 45, the focal length of the ophthalmic imaging system 40 may be made long enough to be able to focus on objects at the anterior region of the eye (e.g. zonules) and object at the posterior region of the eye (e.g., the fundus/retina region F).

Figure 4B:
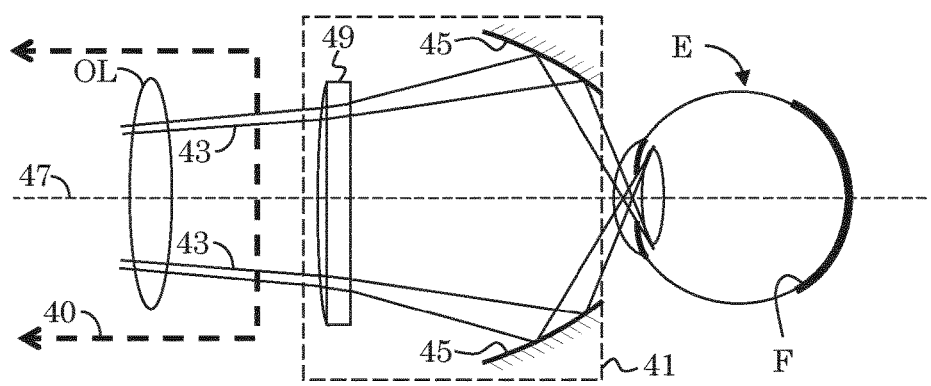

As is shown in FIG. 4B, if the ophthalmic imaging system 40 is optimized for focusing on the posterior segment of the eye, and has difficulty focusing on the anterior region of the eye, then the adapter 41 may incorporate a center lens 49 to help focus the system's imaging beam 43 onto the desired anterior segment of the eye, e.g., onto zonules. As discussed above in reference to FIG. 4A, reflective surface 45 of FIG. 4B may be a peripheral curved reflective surface in the shape of a conical section with curvature along the z-axis, and the curvature of the reflective surface 45 may serve to create a focus at the same distance from the reflective surface 45 on both translational axes to prevent astigmatism of the illumination and imaging. Optionally, the outer region (e.g., peripheral region) of the central lens 49 (e.g., the portion of the central lens through which the system's imaging beam 43 passes to image zonules) may be used together with the reflective surface 45 (e.g., which may be a conical mirror) to correct for aberrations, if needed. In the present configuration, the imaging system could be used to separately image the anterior segment or posterior segment of the eye. For example, when imaging the fundus/retina F, adapter 41 may be removed from the ophthalmic imaging system 40, and the imaging system may be used to directly image the retina F of the eye E. When imaging the zonules, or other anterior features of the eye typically obscured/blocked by the iris, then adapter 41 would be placed on (e.g. attached to) the ophthalmic imaging system 40 in order to increase the entrance angle of the imaging beam 43 at the pupil. An alternative to selectively removing the adapter 41 when wanting to image the posterior segment of the eye would be to remove (or make substantially transparent) a central region of central lens 49 so as to not interfere with the system's imaging beam 43 when imaging the posterior of the eye along the system's optical center 47. In this manner, the adapter 41 may be affixed to the imaging system 40 without having to be selectively removed or replaced depending upon the anterior or posterior segment of the eye that is to be imaged.

Figure 4C:
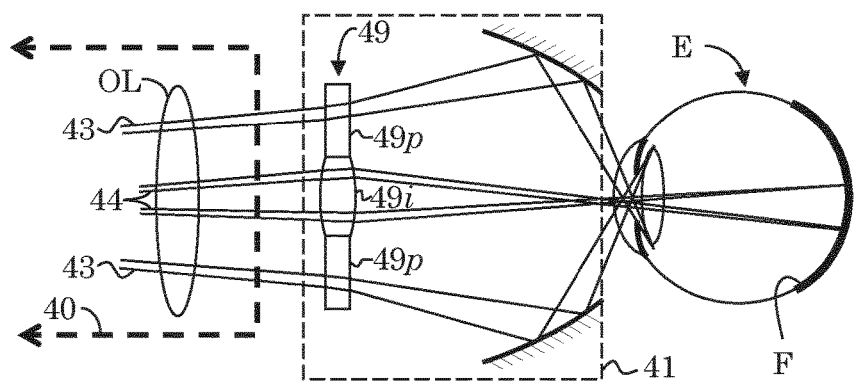

FIG. 4C provides an alternate configuration that permits focusing on both the anterior and posterior segments of the eye at the same time. In the present case, a peripheral region 49p of center lens 49 would function in a manner similar to that of FIG. 4B, and help focus the system's imaging beam 43 onto the anterior segment of the eye. However, it may be desirable to simultaneously have a second beam 44 that may be focused on (and optionally scanned across the) posterior segment of the eye, e.g., the fundus F, such as by having an inner region 49i of central lens 49 configured for focusing the second beam 44 on the posterior of the eye. This may be the case if it is desired to image the fundus F (such as by means of a scanning laser ophthalmoscopy, SLO, or other fundus imaging system), simultaneously with imaging (e.g., by use of an OCT system) the zonules of the eye. In this case, the image from the SLO may be used to generate motion tracking information by comparing a currently captured image with a prior reference image. The motion tracking information may be used for motion correction of the system imaging beam 43 and/or motion aberration correction of images obtained by system imaging beam 43 in post-processing. Alternatively or additionally, it may be desirable to project a fixation target through the inner region 49i of central lens 49 so as to direct the gaze direction of a patient while the anterior segment (e.g., zonules) of the eye is being imaged. For example, it has been found that a person's nose may pose an obstruction to imaging beam 43 when imaging from a nasal direction, and this obstruction may be reduced by having the patient's gaze point away from the nose (e.g., move the patient's pupil away from the nose). For example, the fixation target may be used to direct the patient to gaze away from the nose when imaging the zonules on the side of the eye farthest from the nose. Thus, the inner region 49i may be configured to provide for fixation through a beam splitter (preferably a dichroic beam splitter), for retinal imaging (which may provide motion tracking), or both fixation and retinal imaging simultaneously.

Figure 4D:
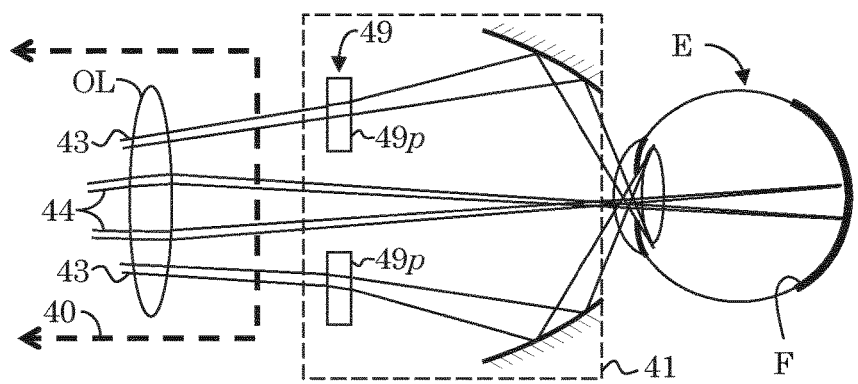

FIG. 4D is still another embodiment where, like discussed above, the inner region of central lens 49 may be removed or made transparent so as to not interfere with the light path along the imaging system's optical center. In the present case, the peripheral region 49p serves to help focus imaging beam 43 on the anterior segment of the eye, and the opened inner region of the central lens 49 permits the secondary beam 44 to pass unobstructed to the posterior of the eye E. As discussed above, the secondary beam 44 may be one or more secondary beams, including a fixation beam to provide a fixation target, a second imaging beam to provide a secondary fundus imaging function (such as for motion tracking), or both.

Figure 5A:
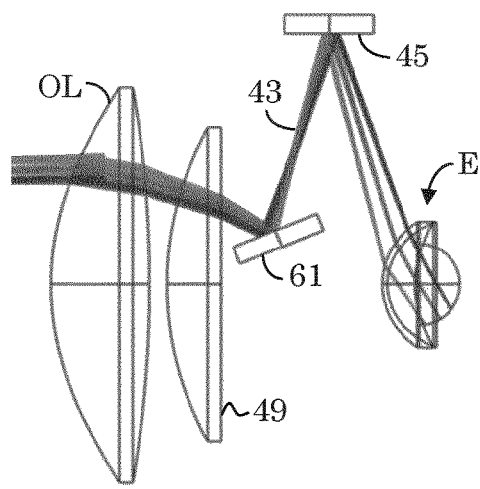
FIGS. 5A, 5B, and 5C illustrate alternate embodiments of the present invention in which the contactless adapter of FIGS. 2 to 4 incorporates a second (more centrally located) reflective surface to redirect an imaging beam to a first reflective surface.
Figure 5B:
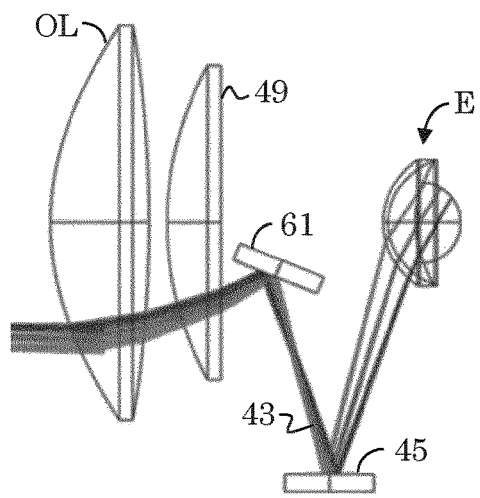
Figure 5C:
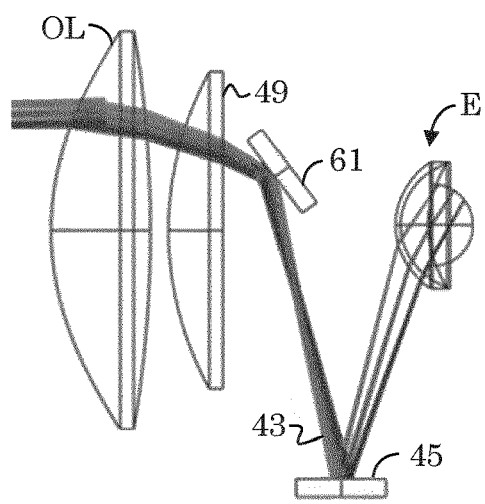

FIGS. 5A, 5B, and 5C illustrate alternate embodiments of the present invention in which the contactless adapter 41 of FIGS. 2 to 4 incorporates a second reflective surface 61 to redirect imaging beam 43 to the aforementioned, angled reflective surface(s) 45. Use of secondary reflective surface 61 facilities the directing of the imaging beam 43 to enter the eye at a desired steep angle. In the embodiment of FIG. 5A, reflective surface 45 is implemented as a discrete reflective surface (i.e., mirror) positioned to reflect the imaging beam from secondary reflective surface 61 and the eye. As shown, the imaging beam 43 may be scanned across reflective surfaces 61 and 45 to be scanned across a target region of the eye E. In the present case, the region of eye E that is scanned is a region farthest from reflective surface 45. FIG. 5B illustrates a repositioning of reflective surfaces 61 and 45 in order to scan (e.g., image) another anterior region of eye E. In the present case, reflective surface 61 may be rotated about a z-axis to face a different direction, and reflective surface 45 may be repositioned (e.g. moved to a different position or have multiple reflective surfaces 45 at strategic scanning positions) in order to scan eye E from a different direction. In the present case, imaging beam 43 is scanned at a different peripheral region of center lens 49 and ocular lens OL. Alternatively, as shown in FIG. 5C, one may avoid rotating secondary reflective surface 61 about the z-axis by either laterally shifting the position of secondary reflective surface 61 and/or altering its angle so as to the receive imaging beam 43 on an opposite surface (as that of FIG. 5A) and thereby alter the direction of imaging beam 43 in a direction different from that of FIG. 5A. In this manner, scanning of imaging beam 43 may be kept to a single region of center lens 49 and ocular lens OL while still scanning multiple opposite sides of the anterior region of eye E.

Figure 6:
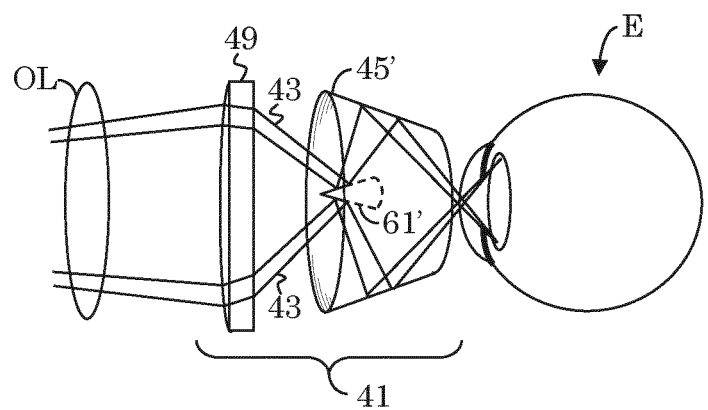
FIG. 6 illustrate an alternate embodiment wherein the first reflective surface of FIGS. 2-5 is implemented as a first conic, reflective surface/cup, and the secondary reflective surface of FIGS. 5A-5C is implemented as a second conic, reflective surface located within the first conic cup.

FIG. 6 illustrate an alternate embodiment wherein the angled reflective surface 45 of FIGS. 2-5 is implemented as conic shaped cup 45', and the secondary reflective surface 61 of FIGS. 5A-5C is replaced by a secondary conic, reflective surface 61' located within (e.g., concentric with) conic cup 45'. Conic cup 45' may be opened at both sides, or center lens 49 may be affixed to an opening of conic cup 45'. In this configuration, a 360 degree image of the anterior segment of eye E may be generated by scanning imaging beam 43 around the periphery of ocular lens OL and center lens 49. This configuration, however, may complicate the imaging of eye E along the optical center 47 of the ophthalmic imaging system due to interference by secondary conic, reflective surface 61'. Consequently, one may remove noncontact adapter 41 from the ophthalmic imaging system when not imaging the anterior segment of eye E at steep imaging angles.

Figure 7:
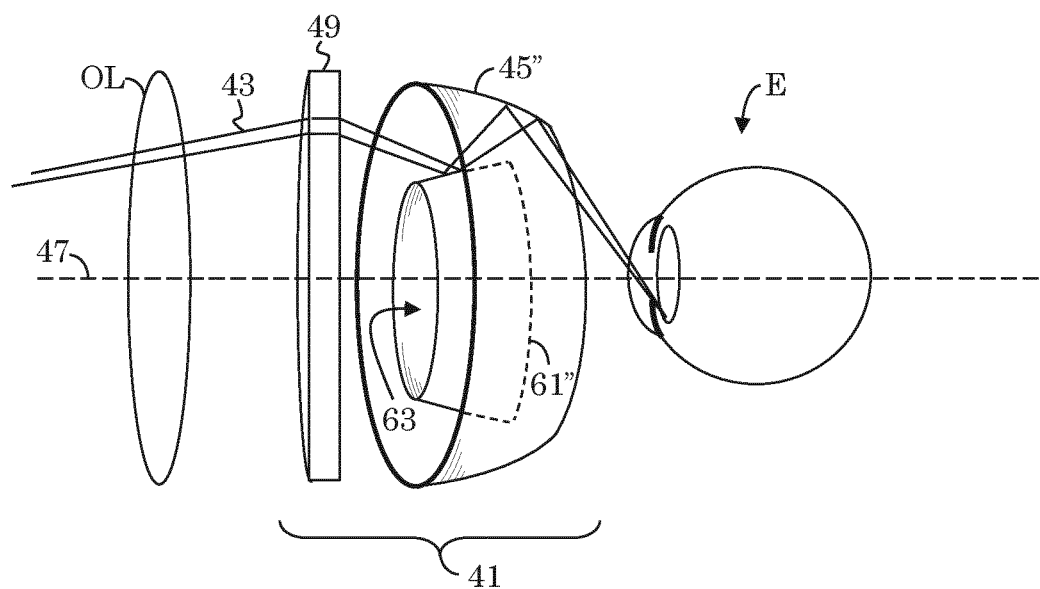
FIG. 7 provides a similar conic construction as FIG. 6, but with an opened region along the optical center of the ophthalmic imaging system.

FIG. 7 provides a similar conic construction as FIG. 6, but with an opened region 63 along the optical center 47 of the ophthalmic imaging system, like in FIG. 4D, (or having a transparent lens or additional central lens to aid focus as in FIG. 4C) so as to permit imaging of the anterior region and posterior region of eye E without requiring removal of noncontact adapter 41. In the present case, the outer reflective surface 45" and inner secondary reflective surface 61" may both be implemented as opened cones. As is explained above, the present configuration also permits simultaneous imaging of the anterior and posterior regions of eye E by using a secondary imaging beam, as illustrated in FIGS. 4C and 4D.

Figure 8A:
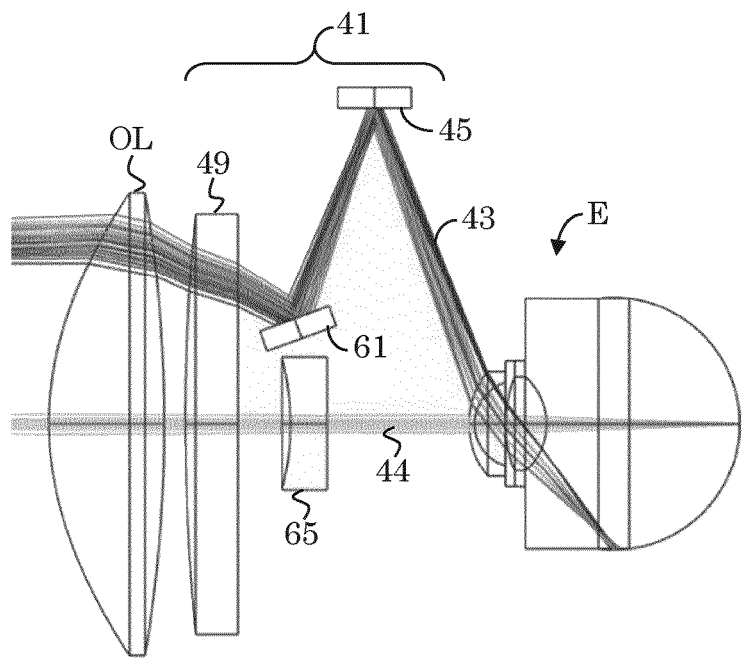
FIGS. 8A and 8B illustrate embodiments similar to those of FIGS. 5A and 5B, respectively, with the addition of a secondary focus lens 65 within the contactless adapter to help focus one or more second beam(s).
Figure 8B:
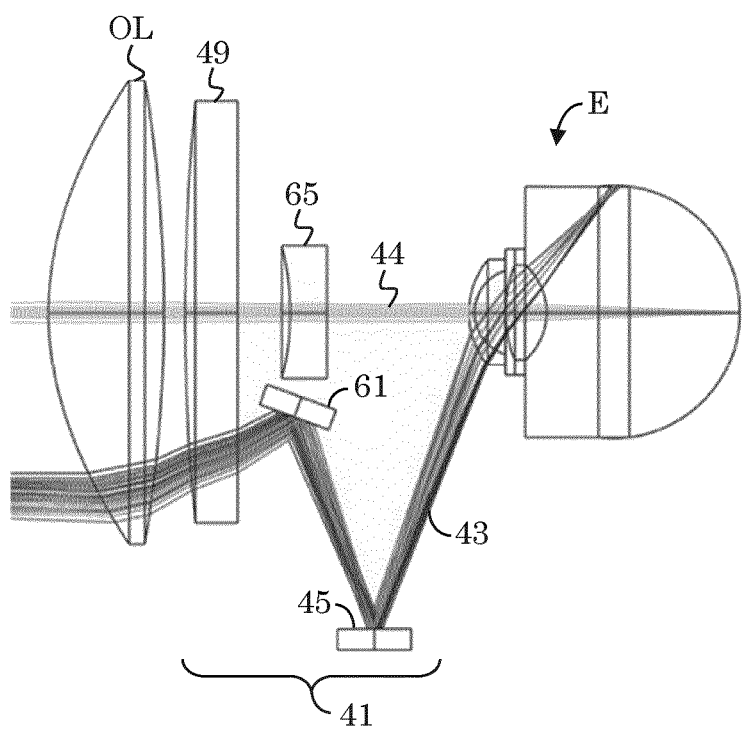

FIGS. 8A and 8B illustrate embodiments similar to those of FIGS. 5A and 5B, respectively, with the addition of a secondary focus lens 65 within contactless adapter 41 to help focus one or more second beam(s) 44 in a manner similar to inner region 49i of FIG. 4C. As discussed above, second beam 44 may provide a fixation point and/or a secondary imaging functionality (e.g., retinal imaging), which may optionally be used for motion tracking (e.g., motion correction). As shown, the optics of the contactless adapter 41 may include plano-mirrors for redirecting the obliquely-scanned beam at a 70° angle into the eye. It may also contain lenses for adjusting vergence and numerical aperture (i.e. spot size) on the anterior segment. For 360° coverage, parabolic or aspheric mirrors (or other reflective surfaces) may be used, as shown in FIGS. 4A, 4B, 4C, 4D, 6, and 7. Optionally, the optics may be optimized to remove astigmatism added from parabolic mirrors.

Figure 9A:
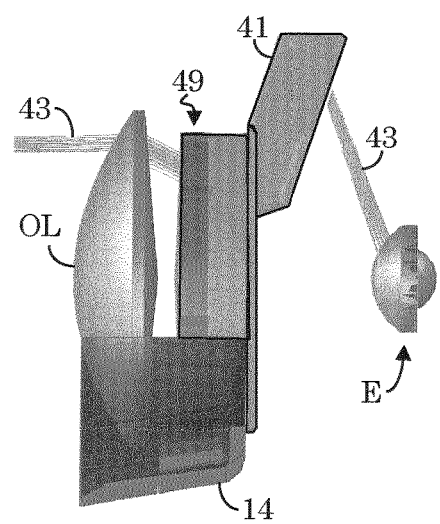
FIGS. 9A, 9B, and 9C show alternate views of an exemplary implementation of the present invention coupled to an exit aperture of an ophthalmic imaging system.
Figure 9B:
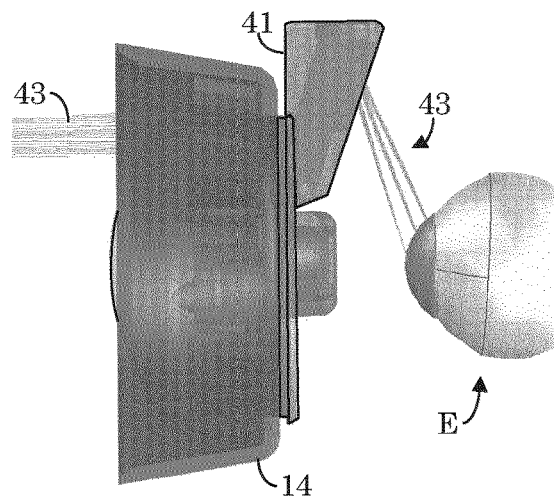
Figure 9C:
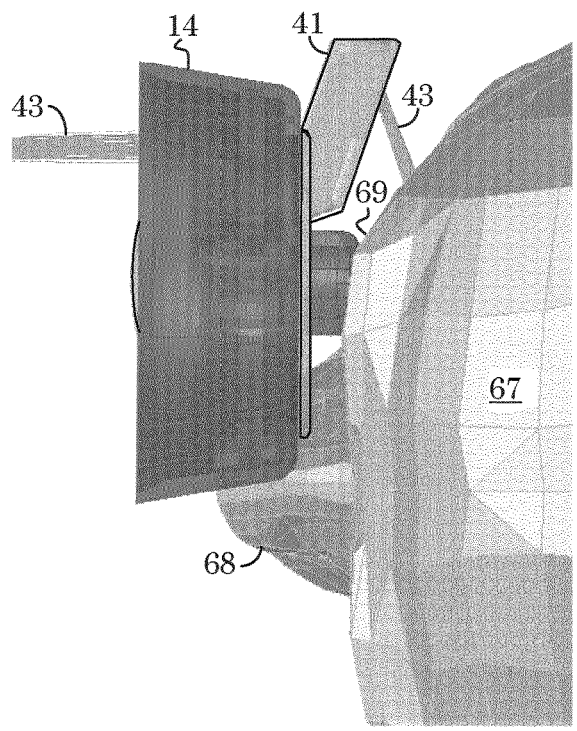

FIGS. 9A, 9B, and 9C show alternate views of an exemplary implementation of the present invention coupled to an exit aperture 14 of an ophthalmic imaging system. FIG. 9A shows a partial cut-away view of a contactless adapter/lens 41 in accord with the present invention attached to the exit aperture 14 of an ophthalmic imaging system. In the present example, contactless adapter 41 extends out from aperture 14 to provide imaging beam 43 at a steep angle and image eye E. FIG. 9B shows a closed view of the aperture 14 of FIG. 9A coupled to contactless adapter 41. FIG. 9C provides a top view of a contactless adapter 41 in accord with the present invention being used to image the anterior segment of the right eye (not shown) of a patient 67. Contactless adapter 41 is shown coupled to aperture 14, which is positioned in front of the patient's right eye between the patient's nose 68 and brow 69.

Hereinafter is provided a description of various hardware and architectures suitable for the present invention.
Fundus Imaging System Two categories of imaging systems used to image the fundus are flood illumination imaging systems (or flood illumination imagers) and scan illumination imaging systems (or scan imagers). Flood illumination imagers flood with light an entire field of view (FOV) of interest of a specimen at the same time, such as by use of a flash lamp, and capture a full-frame image of the specimen (e.g., the fundus) with a full-frame camera (e.g., a camera having a two-dimensional (2D) photo sensor array of sufficient size to capture the desired FOV, as a whole). For example, a flood illumination fundus imager would flood the fundus of an eye with light, and capture a full-frame image of the fundus in a single image capture sequence of the camera. A scan imager provides a scan beam that is scanned across a subject, e.g., an eye, and the scan beam is imaged at different scan positions as it is scanned across the subject creating a series of image-segments that may be reconstructed, e.g., montaged, to create a composite image of the desired FOV. The scan beam could be a point, a line, or a two-dimensional area such a slit or broad line.

Figure 10:
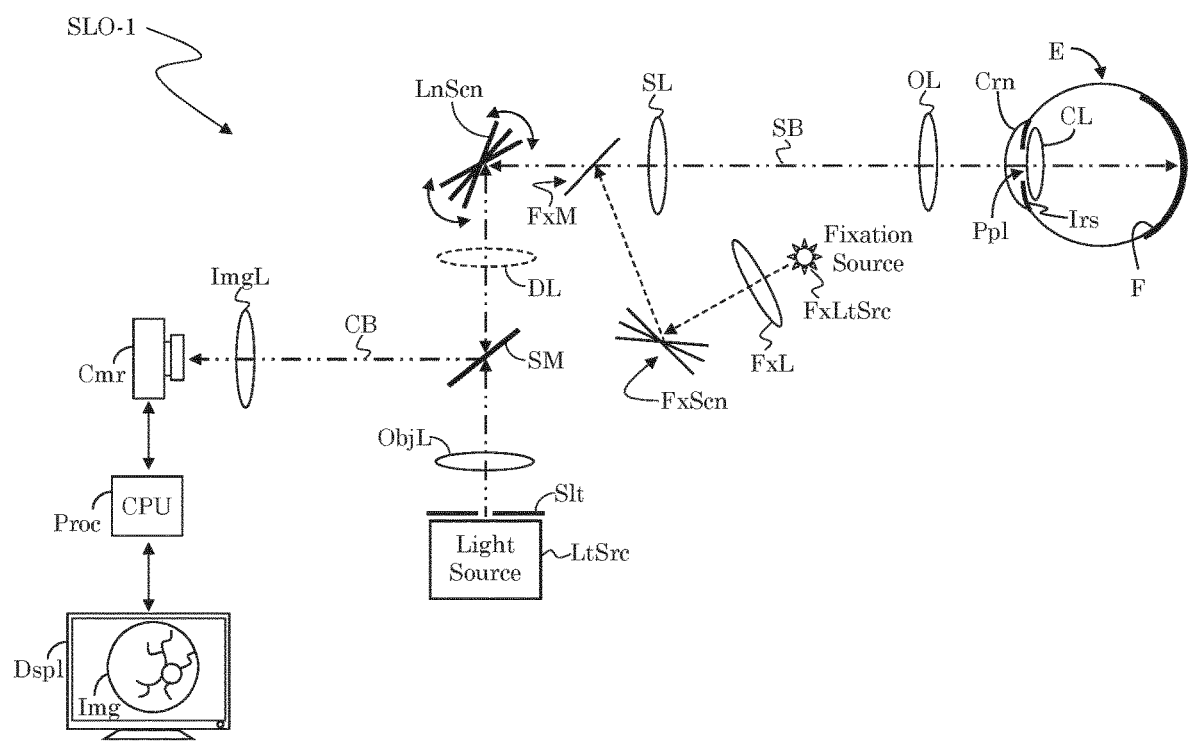
FIG. 10 illustrates an example of a slit scanning ophthalmic system for imaging a fundus.

FIG. 10 illustrates an example of a slit scanning ophthalmic system SLO-1 for imaging a fundus F, which is the interior surface of an eye E opposite the eye lens (or crystalline lens) CL and may include the retina, optic disc, macula, fovea, and posterior pole. In the present example, the imaging system is in a so-called "scan-descan" configuration, wherein a scanning line beam SB traverses the optical components of the eye E (including the cornea Crn, iris Irs, pupil Ppl, and crystalline lens CL) to be scanned across the fundus F. In the case of a flood fundus imager, no scanner is needed, and the light is applied across the entire, desired field of view (FOV) at once. Other scanning configurations are known in the art, and the specific scanning configuration is not critical to the present invention. As depicted, the imaging system includes one or more light sources LtSrc, preferably a multi-color LED system or a laser system in which the etendue has been suitably adjusted. An optional slit Slt (adjustable or static) is positioned in front of the light source LtSrc and may be used to adjust the width of the scanning line beam SB. Additionally, slit Slt may remain static during imaging or may be adjusted to different widths to allow for different confocality levels and different applications either for a particular scan or during the scan for use in suppressing reflexes. An optional objective lens ObjL may be placed in front of the slit Slt. The objective lens ObjL can be any one of state-of-the-art lenses including but not limited to refractive, diffractive, reflective, or hybrid lenses/systems. The light from slit Slt passes through a pupil splitting mirror SM and is directed towards a scanner LnScn. It is desirable to bring the scanning plane and the pupil plane as near together as possible to reduce vignetting in the system. Optional optics DL may be included to manipulate the optical distance between the images of the two components. Pupil splitting mirror SM may pass an illumination beam from light source LtSrc to scanner LnScn, and reflect a detection beam from scanner LnScn (e.g., reflected light returning from eye E) toward a camera Cmr. A task of the pupil splitting mirror SM is to split the illumination and detection beams and to aid in the suppression of system reflexes. The scanner LnScn could be a rotating galvo scanner or other types of scanners (e.g., piezo or voice coil, micro-electromechanical system (MEMS) scanners, electro-optical deflectors, and/or rotating polygon scanners). Depending on whether the pupil splitting is done before or after the scanner LnScn, the scanning could be broken into two steps wherein one scanner is in an illumination path and a separate scanner is in a detection path. Specific pupil splitting arrangements are described in detail in U.S. Pat. No. 9,456,746, which is herein incorporated in its entirety by reference.

From the scanner LnScn, the illumination beam passes through one or more optics, in this case a scanning lens SL and an ophthalmic or ocular lens OL, that allow for the pupil of the eye E to be imaged to an image pupil of the system. Generally, the scan lens SL receives a scanning illumination beam from the scanner LnScn at any of multiple scan angles (incident angles), and produces scanning line beam SB with a substantially flat surface focal plane (e.g., a collimated light path). Ophthalmic lens OL may then focus the scanning line beam SB onto an object to be imaged. In the present example, ophthalmic lens OL focuses the scanning line beam SB onto the fundus F (or retina) of eye E to image the fundus. In this manner, scanning line beam SB creates a traversing scan line that travels across the fundus F. One possible configuration for these optics is a Kepler type telescope wherein the distance between the two lenses is selected to create an approximately telecentric intermediate fundus image (4-f configuration). The ophthalmic lens OL could be a single lens, an achromatic lens, or an arrangement of different lenses. All lenses could be refractive, diffractive, reflective or hybrid as known to one skilled in the art. The focal length(s) of the ophthalmic lens OL, scan lens SL and the size and/or form of the pupil splitting mirror SM and scanner LnScn could be different depending on the desired field of view (FOV), and so an arrangement in which multiple components can be switched in and out of the beam path, for example by using a flip in optic, a motorized wheel, or a detachable optical element, depending on the field of view can be envisioned. Since the field of view change results in a different beam size on the pupil, the pupil splitting can also be changed in conjunction with the change to the FOV. For example, a 45° to 60° field of view is a typical, or standard, FOV for fundus cameras. Higher fields of view, e.g., a widefield FOV, of 60°-120°, or more, may also be feasible. A widefield FOV may be desired for a combination of the Broad-Line Fundus Imager (BLFI) with another imaging modalities such as optical coherence tomography (OCT). The upper limit for the field of view may be determined by the accessible working distance in combination with the physiological conditions around the human eye. Because a typical human retina has a FOV of 140° horizontal and 80°-100° vertical, it may be desirable to have an asymmetrical field of view for the highest possible FOV on the system.

The scanning line beam SB passes through the pupil Ppl of the eye E and is directed towards the retinal, or fundus, surface F. The scanner LnScn1 adjusts the location of the light on the retina, or fundus, F such that a range of transverse locations on the eye E are illuminated. Reflected or scattered light (or emitted light in the case of fluorescence imaging) is directed back along as similar path as the illumination to define a collection beam CB on a detection path to camera Cmr.

In the "scan-descan" configuration of the present, exemplary slit scanning ophthalmic system SLO-1, light returning from the eye E is "descanned" by scanner LnScn on its way to pupil splitting mirror SM. That is, scanner LnScn scans the illumination beam from pupil splitting mirror SM to define the scanning illumination beam SB across eye E, but since scanner LnScn also receives returning light from eye E at the same scan position, scanner LnScn has the effect of descanning the returning light (e.g., cancelling the scanning action) to define a non-scanning (e.g., steady or stationary) collection beam from scanner LnScn to pupil splitting mirror SM, which folds the collection beam toward camera Cmr. At the pupil splitting mirror SM, the reflected light (or emitted light in the case of fluorescence imaging) is separated from the illumination light onto the detection path directed towards camera Cmr, which may be a digital camera having a photo sensor to capture an image. An imaging (e.g., objective) lens ImgL may be positioned in the detection path to image the fundus to the camera Cmr. As is the case for objective lens ObjL, imaging lens ImgL may be any type of lens known in the art (e.g., refractive, diffractive, reflective or hybrid lens). Additional operational details, in particular, ways to reduce artifacts in images, are described in PCT Publication No. WO2016/124644, the contents of which are herein incorporated in their entirety by reference. The camera Cmr captures the received image, e.g., it creates an image file, which can be further processed by one or more (electronic) processors or computing devices (e.g., the computer system of FIG. 13). Thus, the collection beam (returning from all scan positions of the scanning line beam SB) is collected by the camera Cmr, and a full-frame image Img may be constructed from a composite of the individually captured collection beams, such as by montaging. However, other scanning configuration are also contemplated, including ones where the illumination beam is scanned across the eye E and the collection beam is scanned across a photo sensor array of the camera. PCT Publication WO 2012/059236 and US Patent Publication No. 2015/0131050, herein incorporated by reference, describe several embodiments of slit scanning ophthalmoscopes including various designs where the returning light is swept across the camera's photo sensor array and where the returning light is not swept across the camera's photo sensor array.

In the present example, the camera Cmr is connected to a processor (e.g., processing module) Proc and a display (e.g., displaying module, computer screen, electronic screen, etc.) Dspl, both of which can be part of the image system itself, or may be part of separate, dedicated processing and/or displaying unit(s), such as a computer system wherein data is passed from the camera Cmr to the computer system over a cable or computer network including wireless networks. The display and processor can be an all in one unit. The display can be a traditional electronic display/screen or of the touch screen type and can include a user interface for displaying information to and receiving information from an instrument operator, or user. The user can interact with the display using any type of user input device as known in the art including, but not limited to, mouse, knobs, buttons, pointer, and touch screen.

It may be desirable for a patient's gaze to remain fixed while imaging is carried out. One way to achieve this is to provide a fixation target that the patient can be directed to stare at. Fixation targets can be internal or external to the instrument depending on what area of the eye is to be imaged. One embodiment of an internal fixation target is shown in FIG. 10. In addition to the primary light source LtSrc used for imaging, a second optional light source FxLtSrc, such as one or more LEDs, can be positioned such that a light pattern is imaged to the retina using lens FxL, scanning element FxScn and reflector/mirror FxM. Fixation scanner FxScn can move the position of the light pattern and reflector FxM directs the light pattern from fixation scanner FxScn to the fundus F of eye E. Preferably, fixation scanner FxScn is position such that it is located at the pupil plane of the system so that the light pattern on the retina/fundus can be moved depending on the desired fixation location.

Slit-scanning ophthalmoscope systems are capable of operating in different imaging modes depending on the light source and wavelength selective filtering elements employed. True color reflectance imaging (imaging similar to that observed by the clinician when examining the eye using a hand-held or slit lamp ophthalmoscope) can be achieved when imaging the eye with a sequence of colored LEDs (red, blue, and green). Images of each color can be built up in steps with each LED turned on at each scanning position or each color image can be taken in its entirety separately. The three, color images can be combined to display the true color image, or they can be displayed individually to highlight different features of the retina. The red channel best highlights the choroid, the green channel highlights the retina, and the blue channel highlights the anterior retinal layers. Additionally, light at specific frequencies (e.g., individual colored LEDs or lasers) can be used to excite different fluorophores in the eye (e.g., autofluorescence) and the resulting fluorescence can be detected by filtering out the excitation wavelength.

The fundus imaging system can also provide an infrared reflectance image, such as by using an infrared laser (or other infrared light source). The infrared (IR) mode is advantageous in that the eye is not sensitive to the IR wavelengths. This may permit a user to continuously take images without disturbing the eye (e.g., in a preview/alignment mode) to aid the user during alignment of the instrument. Also, the IR wavelengths have increased penetration through tissue and may provide improved visualization of choroidal structures. In addition, fluorescein angiography (FA) and indocyanine green (ICG) angiography imaging can be accomplished by collecting images after a fluorescent dye has been injected into the subject's bloodstream. For example, in FA (and/or ICG) a series of time-lapse images may be captured after injecting a light-reactive dye (e.g., fluorescent dye) into a subject's bloodstream. It is noted that care must be taken since the fluorescent dye may lead to a life-threatening allergic reaction in a portion of the population. High contrast, greyscale images are captured using specific light frequencies selected to excite the dye. As the dye flows through the eye, various portions of the eye are made to glow brightly (e.g., fluoresce), making it possible to discern the progress of the dye, and hence the blood flow, through the eye.

Optical Coherence Tomography Imaging System

In addition to fundus photography, fundus auto-fluorescence (FAF), fluorescein angiography (FA), ophthalmic images may also be created by other imaging modalities, such as, optical coherence tomography (OCT), OCT angiography (OCTA), and/or ocular ultrasonography. The present invention, or at least portions of the present invention with minor modification(s) as it would be understood in the art, may be applied to these other ophthalmic imaging modalities. More specifically, the present invention may also be applied to ophthalmic images produces by an OCT/OCTA system producing OCT and/or OCTA images. For instance, the present invention may be applied to en face OCT/OCTA images. Examples of fundus imagers are provided in U.S. Pat. Nos. 8,967,806 and 8,998,411, examples of OCT systems are provided in U.S. Pat. Nos. 6,741,359 and 9,706,915, and examples of an OCTA imaging system may be found in U.S. Pat. Nos. 9,700,206 and 9,759,544, all of which are herein incorporated in their entirety by reference. For the sake of completeness, an exemplary OCT/OCTA system is provided herein.

Figure 11:
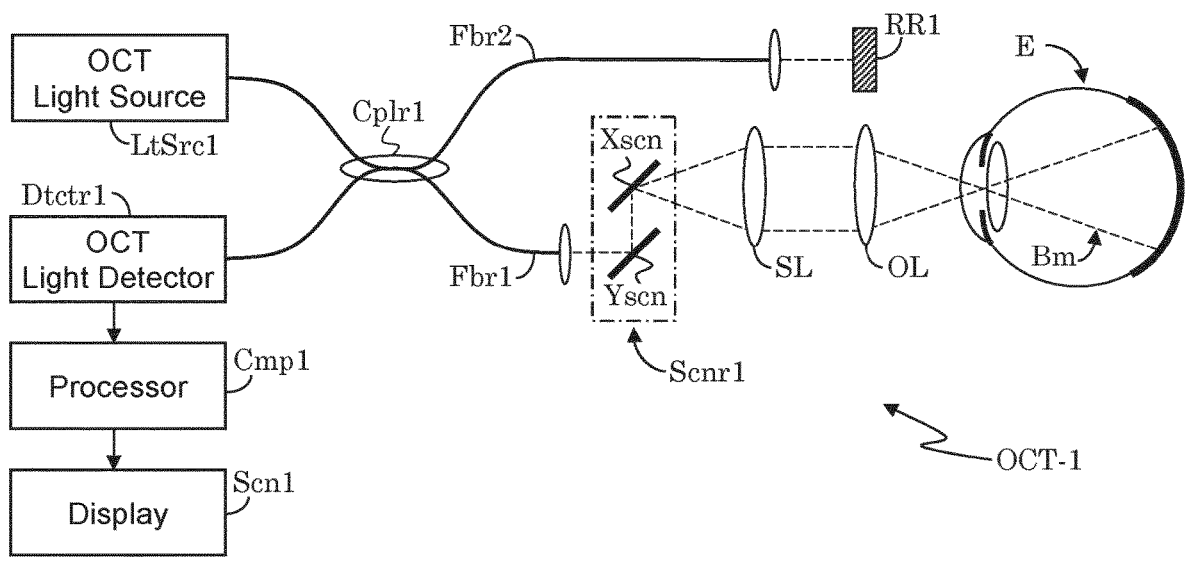
FIG. 11 illustrates a generalized frequency domain optical coherence tomography system used to collect 3-D image data of the eye suitable for use with the present invention.

FIG. 11 illustrates a generalized frequency domain optical coherence tomography (FD-OCT) system used to collect 3-D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 may, for example, be a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally over the region of the sample to be imaged. The light beam from scanner Scnr1 may pass through a scan lens SL and an ophthalmic lens OL and be focused onto the sample E being imaged. The present example illustrates a scan beam that needs to be scanned in two lateral directions (e.g., in x and y directions on a Cartesian plane) to scan a desired field of view (FOV). An example of this would be a point-field OCT, which uses a point-field beam to scan across a sample. Consequently, scanner Scnr1 is illustratively shown to include two sub-scanner: a first sub-scanner Xscn for scanning the point-field beam across the sample in a first direction (e.g., a horizontal x-direction); and a second sub-scanner Yscn for scanning the point-field beam on the sample in traversing second direction (e.g., a vertical y-direction). If the scan beam were a line-field beam (e.g., a line-field OCT), which may sample an entire line-portion of the sample at a time, then only one scanner may be needed to scan the line-field beam across the sample to span the desired FOV. If the scan beam were a full-field beam (e.g., a full-field OCT), no scanner may be needed, and the full-field light beam may be applied across the entire, desired FOV at once.

Figure 13:
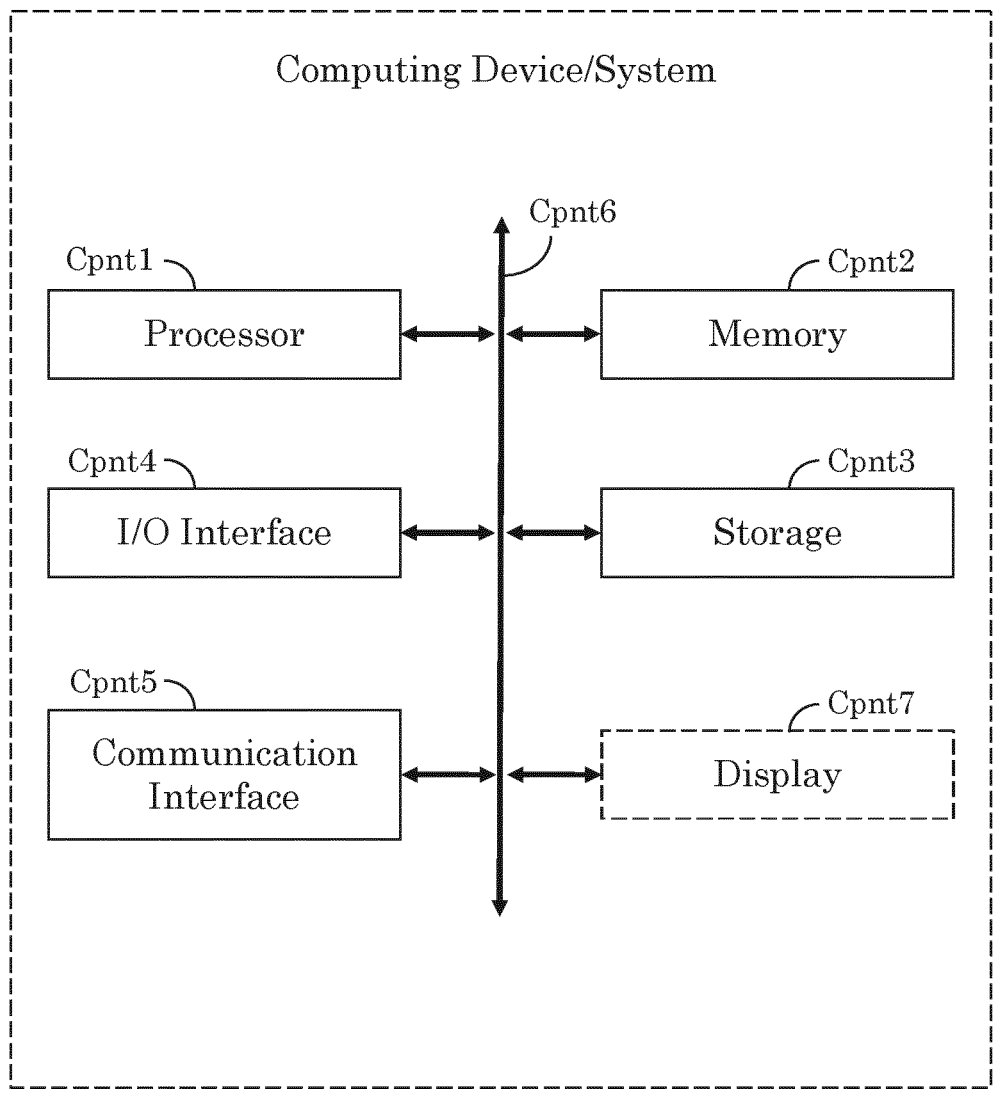
FIG. 13 illustrates an example computer system (or computing device or computer).

Irrespective of the type of beam used, light scattered from the sample (e.g., sample light) is collected. In the present example, scattered light returning from the sample is collected into the same optical fiber Fbr1 used to route the light for illumination. Reference light derived from the same light source LtSrc1 travels a separate path, in this case involving optical fiber Fbr2 and retro-reflector RR1 with an adjustable optical delay. Those skilled in the art will recognize that a transmissive reference path can also be used and that the adjustable delay could be placed in the sample or reference arm of the interferometer. Collected sample light is combined with reference light, for example, in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor (e.g., internal or external computing device) Cmp1 that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument, or functions may be offloaded onto (e.g., performed on) an external processor (e.g., an external computing device), to which the collected data may be transferred. An example of a computing device (or computer system) is shown in FIG. 13. This unit could be dedicated to data processing or perform other tasks which are quite general and not dedicated to the OCT device. The processor (computing device) Cmp1 may include, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that may performs some, or the entire, processing steps in a serial and/or parallelized fashion with one or more host processors and/or one or more external computing devices.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—Holographic Optical Coherence Tomography," *Optics Letters*, 36(13): 2390 2011; Y. Nakamura, et al, "High-Speed Three Dimensional Human Retinal Imaging by Line Field Spectral Domain Optical Coherence Tomography," *Optics Express*, 15(12):7103 2007; Blazkiewicz et al, "Signal-To-Noise Ratio Study of Full-Field Fourier-Domain Optical Coherence Tomography," *Applied Optics*, 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram $(S_j(k))$. The real-valued spectral data typically goes through several post-processing steps including background subtraction, dispersion correction, etc. The Fourier transform of the processed interferogram, results in a complex valued OCT signal output $A_j(z)=|A_j|e^{i\varphi}$. The absolute value of this complex OCT signal, $|A_j|$, reveals the profile of scattering intensities at different path lengths, and therefore scattering as a function of depth (z-direction) in the sample. Similarly, the phase, $\varphi_j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow. A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross-sectional image that includes the z-dimension.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

Figure 12:
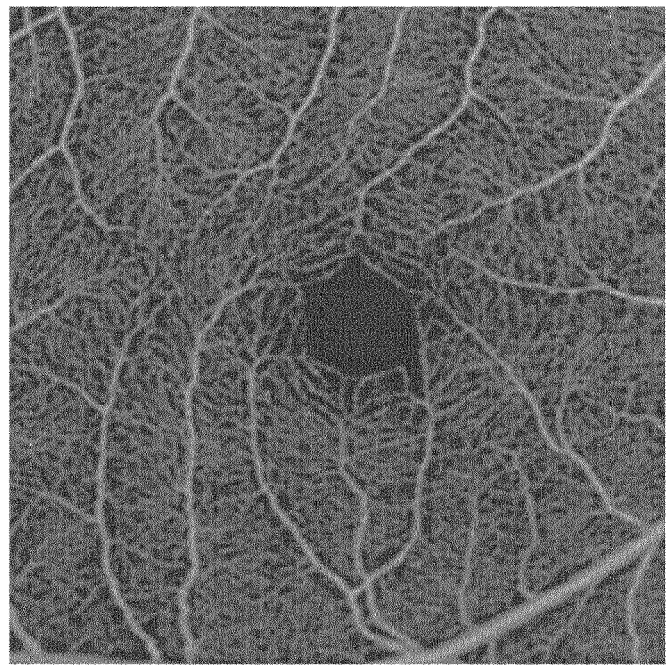
FIG. 12 shows an example of an en face vasculature image.

FIG. 12 shows an example of an en face vasculature image. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image of the vasculature.

Computing Device/System

FIG. 13 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache. During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network. Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. A noncontact lens adapter for imaging the anterior segment of an eye, comprising:
   one or more reflective surfaces housed within the noncontact lens adapter, the noncontact lens adapter having a first end attachable to an ophthalmic imaging device and a second end positionable in front of, and not touching, the eye;
   wherein the adapter receives an imaging beam from the ophthalmic imaging device and redirects the imaging beam, at least in part by use of the one or more reflective surfaces, through the pupil of the eye to target one or more ophthalmic anatomical features behind the iris of the eye and including, or proximate to, the ciliary body of the eye; and
   wherein the one or more reflective surfaces include a plurality of peripheral reflective surfaces along an inner perimeter of the noncontact lens adapter, each peripheral reflective surface having a different reflection angle selected to scan superiorly, inferiorly, nasally or temporally.

2. The adapter of claim 1, wherein the imaging beam is redirected toward the eye at an angle not smaller than 70 degrees relative to the optical center of the ophthalmic imaging device.

3. The adapter of claim 1, wherein the ophthalmic anatomical features include the zonules or an anterior hyaloid face of the eye vitreous.

4. The adapter of claim 1, wherein at least a select one of the one or more reflective surfaces is curved along the optical center of the ophthalmic imaging device, the curvature of the select one reflective surface maintaining a focus at the same distance from the reflective surface on both translational axes (x-axis and y-axis) to mitigate astigmatism of the imaging light beam.

5. The adapter of claim 4, wherein the select one reflective surface extends around the interior of the noncontact lens adapter allowing the ophthalmic imaging device to image in 360 degrees around the crystalline lens of the eye.

6. The adapter of claim 1, further comprising:
a central lens, wherein:
the imaging beam passes through a peripheral region of the central lens to image the anterior segment of the eye; and
the peripheral region is configured to focus the imaging beam onto the anterior segment of the eye or, in combination with the one or more reflective surfaces, to correct for aberrations.

7. The adapter of claim 6, wherein the central lens has a central region configured to receive a second beam from the ophthalmic imaging device directed to the posterior of the eye, the second beam being a fixation beam or a second imaging beam.

8. The adapter of claim 7, wherein the central region is transparent to the second beam or focuses the second beam on the posterior of the eye.

9. The adapter of claim 1, wherein the ophthalmic imaging device captures multiple images of the posterior of the eye through a central region of the noncontact lens adapter concurrently with the imaging of the anterior of the eye, generates motion tracking information based on the multiple images of the posterior of the eye, and applies motion correction to images of the anterior of the eye based on the generated motion tracking information.

10. The adapter of claim 1, comprising:
a second reflective surface that receives the imaging beam from the ophthalmic imaging device and redirects the imaging beam to said one or more reflective surfaces, said one or more reflective surfaces redirecting the imaging beam to the eye.

11. The adapter of claim 10, wherein the second reflective surface is moveable laterally or about a tilt axis to scan a plurality of different regions of the anterior of the eye.

12. The adapter of claim 1, comprising:
a first lens configured to focus the imaging beam on the anterior of the eye; and
a second lens configured to focus a second imaging beam from the ophthalmic imaging region along the optical center of the ophthalmic imaging region to image the posterior of the eye, the first and second lenses permitting concurrent imaging of the anterior and posterior of the eye.

13. The adapter of claim 1, wherein the noncontact lens adapter has a refractive power of at least +20 diopters.

14. The adapter of claim 1, wherein the ophthalmic imaging device includes one or more of a fundus imager, an optical coherence tomography (OCT) system, or an OCT angiography system.

15. A noncontact lens adapter for imaging the anterior segment of an eye, comprising:
one or more reflective surfaces housed within the noncontact lens adapter, the noncontact lens adapter having a first end attachable to an ophthalmic imaging device and a second end positionable in front of, and not touching, the eye,
wherein the adapter receives an imaging beam from the ophthalmic imaging device and redirects the imaging beam, at least in part by use of the one or more reflective surfaces, through the pupil of the eye to target one or more ophthalmic anatomical features behind the iris of the eye and including, or proximate to, the ciliary body of the eye; and
the one or more reflective surfaces includes a first conic reflective surface; and
a second reflective surface is a second conic reflective surface concentric within the first conic reflective surface.

16. The adapter of claim 15, wherein:
the second conic reflective surface is positioned along the optical center of the ophthalmic imaging device, and provides an unimpeded optical path for the ophthalmic imaging image device to image the posterior of the eye through a central area of second conic reflective surface.

17. A noncontact lens adapter for imaging the anterior segment of an eye, comprising:
one or more reflective surfaces housed within the noncontact lens adapter, the noncontact lens adapter having a first end attachable to an ophthalmic imaging device and a second end positionable in front of, and not touching, the eye;
wherein:
the adapter receives an imaging beam from the ophthalmic imaging device and redirects the imaging beam, at least in part by use of the one or more reflective surfaces, through the pupil of the eye to target one or more ophthalmic anatomical features behind the iris of the eye and including, or proximate to, the ciliary body of the eye;
the ophthalmic anatomical features include the zonules; and
the ophthalmic imaging device includes a data processing unit processing imaging data and quantifying zonule metrics based on the imaging data including one or more of zonule density, zonule thickness, zonule length, zonule branching points, zonule branch count, and the location and number of zonule contact points with the crystalline lens or capsular bag.

18. The adapter of claim 17, wherein the data processing unit assigns a health grade value to the zonules based on the one or more zonule metrics.

19. A noncontact lens adapter for imaging the anterior segment of an eye, comprising:
one or more reflective surfaces housed within the noncontact lens adapter, the noncontact lens adapter having a first end attachable to an ophthalmic imaging device and a second end positionable in front of, and not touching, the eye;
wherein:
the adapter receives an imaging beam from the ophthalmic imaging device and redirects the imaging beam, at least in part by use of the one or more reflective surfaces, through the pupil of the eye to target one or more ophthalmic anatomical features behind the iris of the eye and including, or proximate to, the ciliary body of the eye;
the ophthalmic imaging device includes a data processing unit processing imaging data and quantifying a plurality of anterior ophthalmic metrics based on the images of the anterior segment of an eye; and
based on the anterior ophthalmic metrics, the data processing unit assigns one or more diagnostic designation to the eye, including zonular weakness, dehiscence, lens or intraocular lens (IOL) subluxation or luxation, zonulopathy, misplaced IOL, uveitis-glaucoma-hyphema (UGH) syndrome, tumours of ciliary body, iris epithelial cysts, or tumours of the posterior iris.

\* \* \* \* \*